United States Patent [19]
Jones et al.

[11] Patent Number: 5,955,550
[45] Date of Patent: Sep. 21, 1999

[54] POLYMERIC VEHICLE FOR PROVIDING SOLVENTLESS COATING COMPOSITIONS

[75] Inventors: Frank N. Jones, Ann Arbor, Mich.; Shou-Kuan Fu, Shanghai, China; Xiaoying Yuan, Fairport, N.Y.; Jun Hua, Morganville, N.J.; Vijay Swarup, Houston, Tex.

[73] Assignees: Exxon Chemical Patents, Inc., Baytown, Tex.; Eastern Michigan University, Ypsilanti, Mich.

[21] Appl. No.: 08/966,992

[22] Filed: Nov. 10, 1997

Related U.S. Application Data

[63] Continuation of application No. 08/737,719, filed as application No. PCT/US96/01141, Jan. 24, 1996, abandoned, which is a continuation-in-part of application No. 08/487,962, Jun. 7, 1995, Pat. No. 5,587,428, which is a continuation-in-part of application No. PCT/US95/01053, Jan. 7, 1995, which is a continuation-in-part of application No. 08/186,430, Jan. 25, 1994, abandoned.

[51] Int. Cl.$^6$ .................................................. C08F 20/02
[52] U.S. Cl. .............................. 525/440; 528/59; 528/60; 528/65; 528/66; 528/80; 528/81; 528/83; 528/85; 528/272; 528/301
[58] Field of Search ...................... 528/60, 65, 66, 528/80, 81, 83, 85, 272, 301, 59; 525/440

[56] References Cited

U.S. PATENT DOCUMENTS

| | | |
|---|---|---|
| 3,409,579 | 11/1968 | Robins . |
| 3,652,713 | 3/1972 | Okazaki . |
| 3,789,044 | 1/1974 | Taft et al. . |
| 3,804,920 | 4/1974 | Cunningham et al. . |
| 3,836,491 | 9/1974 | Taft et al. . |
| 3,857,817 | 12/1974 | Henshaw et al. . |
| 3,994,851 | 11/1976 | Chang . |
| 4,031,068 | 6/1977 | Cantor . |
| 4,072,662 | 2/1978 | van der Linde . |
| 4,104,240 | 8/1978 | Buter . |
| 4,128,526 | 12/1978 | Borman . |
| 4,130,549 | 12/1978 | Ueno et al. .................. 528/93 |
| 4,188,477 | 2/1980 | Smith et al. ................. 528/288 |
| 4,331,782 | 5/1982 | Linden ........................ 525/173 |
| 4,340,519 | 7/1982 | Kotera et al. ............... 523/414 |
| 4,343,839 | 8/1982 | Blegan ....................... 427/340 |
| 4,365,039 | 12/1982 | Blegan ....................... 524/773 |
| 4,374,167 | 2/1983 | Blegan ....................... 428/141 |
| 4,374,181 | 2/1983 | Blegan ....................... 428/423.3 |
| 4,459,401 | 7/1984 | Sekmakas et al. ............ 528/296 |
| 4,465,815 | 8/1984 | Chattha ...................... 525/443 |
| 4,576,997 | 3/1986 | Trotter et al. ............... 525/444 |
| 4,631,320 | 12/1986 | Parekh et al. ............... 525/452 |
| 4,753,975 | 6/1988 | Vander Kooi, Jr. ........... 524/539 |
| 4,847,314 | 7/1989 | Tortorello et al. ........... 524/317 |
| 4,877,838 | 10/1989 | Toman ........................ 525/107 |
| 4,888,441 | 12/1989 | Calbo, Jr. et al. ............ 560/198 |
| 4,922,002 | 5/1990 | Calbo, Jr. et al. ............ 560/193 |
| 5,011,894 | 4/1991 | Robeson et al. .............. 525/437 |
| 5,019,100 | 5/1991 | Hennink et al. ............... 623/6 |
| 5,025,061 | 6/1991 | Ishiodoya et al. ........... 524/539 |
| 5,041,476 | 8/1991 | Wilder ......................... 524/80 |
| 5,043,192 | 8/1991 | Jones et al. .................. 430/109 |
| 5,057,392 | 10/1991 | McCabe et al. ............... 430/109 |
| 5,075,393 | 12/1991 | Thompson .................... 525/444 |
| 5,115,016 | 5/1992 | Dickens et al. .............. 524/513 |
| 5,134,222 | 7/1992 | Cooke et al. ................. 528/272 |
| 5,137,984 | 8/1992 | Kangas et al. ............... 525/411 |
| 5,143,985 | 9/1992 | Robeson et al. ............. 525/437 |
| 5,162,153 | 11/1992 | Cooke et al. ................. 428/373 |
| 5,162,455 | 11/1992 | Greene ........................ 525/437 |
| 5,166,289 | 11/1992 | Yezrielev et al. ............ 525/433 |
| 5,194,569 | 3/1993 | Kim et al. .................... 528/206 |
| 5,210,155 | 5/1993 | Yezrielev et al. ............ 525/422 |
| 5,235,006 | 8/1993 | Jones et al. ................. 525/510 |
| 5,239,018 | 8/1993 | Yezrielev et al. ............ 525/418 |
| 5,244,699 | 9/1993 | Jones et al. .................... 428/1 |

(List continued on next page.)

FOREIGN PATENT DOCUMENTS

| | | |
|---|---|---|
| 0014808 | 9/1980 | European Pat. Off. . |
| 0418631 | 3/1991 | European Pat. Off. . |
| 0419088 | 3/1991 | European Pat. Off. . |
| 2500308 | 7/1976 | Germany . |
| 2809768 | 9/1978 | Germany . |
| 05155840 | 6/1993 | Japan . |
| 1290848 | 9/1972 | United Kingdom . |
| WO 95/19997 | 7/1995 | WIPO . |
| WO 95/20004 | 7/1995 | WIPO . |
| WO 96/23016 | 8/1996 | WIPO . |
| WO 96/23034 | 8/1996 | WIPO . |
| WO 96/23035 | 8/1996 | WIPO . |

OTHER PUBLICATIONS

Swarup, et al., "Thermoset Coating Compositions Having Improved Hardness," Research Disclosure No. 374, pp. 446–457, (Jun. 1995), Kenneth Mason Publications, Ltd., Hampshire, England.

Stumpe et al., "Deactivation of Excited States in Polyurethanes by Energy Transfer to Salicylic Acid Derivatives and its Application to the Photo–stabilisation of Polyurethanes", Polymer Degradation and Stability 17 (1987) 103–115.

100–Percent–Solids, liquid Finish, Products Finishing 96 (1993).

Muizebelt et al., "Permeabilities of Model Coatings: Effect of Crosslink Density and Polarity," pp. 110–114, Polymeric Materials for Corrosion Control© 1986 American Chemical Society.

Wicks et al., Organic Coatings: Science and Technology, vol. II: Applications, Properties, and Performance, pp. 280–282, Wiley 1994.

Wojcik, "Low Viscosity Polyisocyanates for Higher Solids Coatings," Paper Presented at ACS Meeting, Mar. 1994.

*Primary Examiner*—John M. Cooney, Jr.
*Attorney, Agent, or Firm*—Fitch, Even, Tabin & Flannery

[57] ABSTRACT

This invention relates to a polymeric vehicle which reduces or eliminates VOCs in coating compositions by providing a formulated coating composition which does not require an organic solvent for application to a substrate. The polymeric vehicle of the invention comprises at least one linear oligoester diol effective for crosslinking with a crosslinker, and having a number average molecular weight within controlled limits of a polydispersity index effective for controlling the viscosity of the polymeric vehicle.

28 Claims, No Drawings

U.S. PATENT DOCUMENTS

| | | | |
|---|---|---|---|
| 5,245,002 | 9/1993 | Kuo | 528/176 |
| 5,322,884 | 6/1994 | Wellman et al. | 524/601 |
| 5,326,831 | 7/1994 | Yezrielev et al. | 525/437 |
| 5,334,671 | 8/1994 | Yezrielev et al. | 525/443 |
| 5,334,952 | 8/1994 | Wellman et al. | 524/601 |
| 5,338,479 | 8/1994 | Panandiker et al. | 252/183.71 |
| 5,453,469 | 9/1995 | Yezrielev et al. | 525/418 |
| 5,458,920 | 10/1995 | Yezrielev et al. | 437/385.5 |
| 5,681,906 | 10/1997 | Yezrielev et al. | 525/450 | ately eliminate solvents. While each have advantages, each coating composition has disadvantages.

POLYMERIC VEHICLE FOR PROVIDING SOLVENTLESS COATING COMPOSITIONS

This application is a continuation application of Ser. No. 08/737,719 filed Nov. 13, 1996 which is now abandoned, which is an application filed under 35 USC §371 of PCT/US96/01141, filed Jan. 24, 1996, which is a continuation-in-part application of Ser. No. 08/487,962, filed Jun. 7, 1995 which is now U.S. Pat. No. 5,587,428, which is a continuation-in-part application of Ser. No. PCT/US95/01053, filed Jan. 7, 1995, which is a continuation-in-part application of Ser. No. 08/186,430, filed Jan. 25, 1994 which is now abandoned.

FIELD OF THE INVENTION

The present invention relates to a blend of ingredients which is effective for providing a formulated coating composition without the addition of organic solvent to provide a composition which may be applied to a substrate as a protective paint by existing commercial application equipment. More particularly, this invention is directed to a polymeric vehicle which is a blend of a linear oligoester diol having a number average molecular weight in the range of from about 275 to about 1200 and a crosslinker, a solventless formulated coating composition made from the polymeric vehicle, a coating binder made from the solventless formulated coating composition and a method of controlling the viscosities of the polymeric vehicle and formulated coating composition.

DESCRIPTION OF THE PRIOR ART AND BACKGROUND

One of the primary components in paint is the "film former" that provides a film for the protective function for a substrate coated with the paint. Film forming components of liquid paint include resins which have required organic solvents to provide the resins with suitable viscosities such that the paint can be applied by existing commercial application equipment. Use of organic solvents, however, raises at least two problems. In the past and potentially in the future, petrochemical shortages mitigate against the use of organic solvent in great volumes. Second, environmental concern mitigates against the use of organic solvents.

Environmental concern has become increasingly important. This concern not only extends to preservation of the environment for its own sake, but extends to public safety as to both living and working conditions. Volatile organic emissions resulting from coating compositions which are applied and used by industry and by the consuming public are not only often unpleasant, but also contribute to photochemical smog. Governments have established regulations setting forth guidelines relating to volatile organic compounds (VOCs) which may be released to the atmosphere. The U.S. Environmental Protection Agency (EPA) has established guidelines limiting the amount of VOCs released to the atmosphere, such guidelines being scheduled for adoption or having beer adopted by various states of the United States. Guidelines relating to VOCs, such as those of the EPA, and environmental concerns are particularly pertinent to the paint and industrial coating industry which uses organic solvents which are emitted into the atmosphere.

To reduce organic solvent content and VOCs, researchers have developed high solids coating compositions and powdered coating compositions. High solids compositions generally are liquid and are designed to minimize solvents. Powdered coating compositions are solid powders and generally eliminate solvents. While each have advantages, each coating composition has disadvantages.

Coating compositions which include high solids polymeric vehicles based upon polyesters have become popular. In high solid polyesters as opposed to "conventional" compositions which use organic solvents, high molecular weight generally needs to be achieved during crosslinking rather than being attained from the basic polyester polymer. Hence, high solids polyesters normally supply a greater number of reactive sites (predominantly hydroxyl groups) available for crosslinking. The resultant polymers typically exhibit 70–80% solids-weight when reacted stoichiometrically with isocyanate crosslinkers, but frequently yield empirical solids up to 12% lower, when crosslinked with melamine resins. Despite their reduced use of organic solvents, high solids polyester coating compositions could be produced on the same equipment and be employed in many of the same applications as lower solids "conventional" polyester coating compositions. Further, as a result of their many strengths such as ease of manufacturing and use, low volatile emissions, reduced energy requirements, greater application efficiency, lower handling and storage costs, and excellent physical properties, high solids polyester coating compositions have enjoyed spectacular growth in manufacture and use. They still require organic solvents, however, and are a source of VOCs.

Powder coatings and UV-curable coatings are desirable ultrahigh or 100% solids coatings. However, there are limitations as to the techniques and the equipment which is used to apply the powdered and UV-curable compositions.

To reduce solvent content and VOCs in polymeric vehicles and formulated coating compositions for paints, researchers have been driven by three major objectives: controlling the reactivity of the film forming components in the paint; keeping the viscosity of the components in the paint low to minimize the organic solvents in the paint and to keep the VOCs in the paint at the lowest possible level; and keeping the components in the paint at a low volatility to minimize VOCs.

High viscosity is a major problem which needs to be solved in ultrahigh or 100% solids coatings. In high solids polyester coatings, the viscosity of concentrated polyester solutions depends on several variables. Molecular weight and molecular weight distribution are two important factors. According to polymer physics theory, the viscosity of polymers in the liquid state depends mainly on the average molecular weight and the temperature, so it is desirable to reduce average molecular weight for solventless polyester coating. The major factor controlling molecular weight ($M_n$) of a polyester is the mole ratio of dibasic acid/diol or polyol. A dibasic acid to diol or polyol ratio of the order of 2:3 is typical. However, loss of polyol during the production of the polyester can result in a significantly higher molecular weight than predicted from the starting ratio. It is necessary to add some extra glycol to compensate for loss. In very high solids coatings, the low molecular weight fraction of resin may be volatile enough to evaporate when a thin film is baked. Such loss has to be counted as part of the VOC emissions.

The number of functional groups per molecule also affects the viscosity because of hydrogen bonding. Most oligomers or polymers require high functionality to achieve a highly crosslinked film and reasonable Tgs to have adequate film properties for most applications. The high functionality tends to increase the viscosity significantly.

An object of the invention is to provide a polymeric vehicle which will reduce or eliminate VOCs in coating compositions by providing a polymeric vehicle which is effective for providing a formulated coating composition which does not require organic solvent to reduce the viscosity of the formulated coating composition for application of the formulated coating composition.

Another object of this invention is to provide polymeric vehicles which are not only low in VOCs and effective in providing solventless formulated coating compositions, but which provide coating binders with good film properties such as hardness and impact resistance.

Yet another object of this invention is to control the viscosity to low levels at a specific application shear rate of a liquid polymeric vehicle or a liquid formulated coating composition without using organic solvents or water for such control.

Further, objects and advantages of the invention will be found by reference to the following description.

SUMMARY OF THE INVENTION

The invention provides a liquid polymeric vehicle which is effective for providing a formulated coating composition which does not require the addition of organic solvent to obtain a viscosity such that the formulated coating composition may be applied by existing commercial application equipment. The invention also provides a way of controlling the viscosity of the polymeric vehicle at a specific shear rate using linear oligoester diols having a number average molecular weight within controlled limits of a polydispersity index, a linearity and a molecular weight limitation which are effective for controlling the viscosity of the polymeric vehicle.

The invention provides a polymeric vehicle which has at least about 92 weight percent solids and which comprises at least one linear oligoester diol having a number average molecular weight in the range of from about 275 to about 1200 which is effective for reaction with a crosslinker. The linear oligoester diol and/or mixture of such diols has a polydispersity index ($M_w/M_n$) of less than about 2.6, preferably less than 2.2, preferably in the range of from about 1.4 to about 1.8, and most preferably less than about 1.4, and a viscosity in the range of from about 0.1 to about 1.2 Pa.s at a temperature in the range of from about 20° C. to about 50° C. as measured on a Brookfield thermocell viscometer model DV-II+ using a SC4-31 spindle at 6 rpm. The use of a linear oligoester or mixture of such oligoesters in the polymeric vehicle is important because it has a low viscosity and has a sufficiently low evaporation rate such that the oligoester has at least about 93 weight percent solids when tested by ASTM test D-2369-92. This minimizes the VOC content of the oligoester since only a small fraction of the material will evaporate upon baking. Generally, when the crosslinker is added even a lower fraction of the oligomer will evaporate during baking because part of the volatile material reacts with the crosslinker.

The crosslinker may be a solid, but generally is a liquid. In either circumstance, the crosslinker is miscible or soluble in a blend of oligoester diol and crosslinker without raising the viscosity of the blend of the oligoester diol/crosslinker or the formulated coating composition above the range of from about 0.1 to about 20 Pa.s at about 20 to about 60° C. at a shear rate of at least 1000 sec.$^{-1}$ without organic solvent.

The crosslinker has an average functionality of greater than about 2.4, and preferably greater than about 2.9, a viscosity of less than about 3.0 Pa.s at about 25° C. when it is a liquid, preferably is a liquid at about 10° C., and a has functionality which is reactive with the hydroxyl groups of the oligoester. The polymeric vehicle comprises at least about a stoichiometric amount of crosslinker which will react with the hydroxyls of the linear oligoester diol. A catalyst such as a soluble tin compound for polyisocyanates or an acid for amino resins generally should be used in an amount effective to effect the reaction between the oligoester diol and the crosslinker. In the aspect of the invention which includes amino resins as the crosslinking agent, the invention is effective for providing a polymeric vehicle which will have at least about 80, preferably about 88 to about 90 and most preferably at least about 92 weight percent solids. Since no solvent is added, the volatile material comprises primarily crosslinking reaction by-products and traces of volatile materials and impurities present in the resinous and other components of the formulation. When the crosslinking reaction does not evolve volatile by-products, for example the aspect of the invention which includes a polyisocyanate as a crosslinking agent, the invention is effective for providing a polymeric vehicle which will have at least about 97 weight percent solids and typically about 99 weight percent solids. In this connection, the aforedescribed polymeric vehicles, and formulated coating compositions based thereon, may be less than 100 weight percent solids without the addition of organic solvents because low molecular weight fractions of the oligoester which forms the polymeric vehicle may evaporate or otherwise originate from the polymeric vehicle and become a VOC with the application of heat for a thermoset into a coating binder.

In a very important aspect of the invention, the crosslinker blended with the linear oligoester diol is a polyisocyanate or is a blend which comprises a polyisocyanate and melamine in amounts effective to achieve desired hardnesses, impact resistance and adhesion for the coating binder.

In an important aspect of the invention, the polymeric vehicle has a viscosity of not more than about 1.2 Pa.s at the temperature of application, which is usually not more than about 50° C. and is preferably about 25° C. The polymeric vehicle preferably has a viscosity of not more than about 0.8 Pa.s at 25° C. to provide a coating binder having a pencil hardness of at least about B.

DESCRIPTION OF THE PREFERRED EMBODIMENTS

"Polyester" means a polymer which has —C(=O)O— linkages in the main chain of the polymer. "Oligomer" means a compound that is a polymer, but has a number average weight not greater than about 10,000 with or without repeating monomeric units. "Crosslinking agent" means a di- or polyfunctional substance containing functional groups that are capable of forming covalent bonds with hydroxyl groups that are present on the oligoester diol. The crosslinking agent may be a blend; hence, there may be more than one substance which forms a blend of substances which form covalent bonds with the hydroxyl groups of the oligoester diol. Amino resins and polyisocyanates are members of this class. "Polymeric vehicle" means polymeric and resinous components in the formulated coating, i.e., before film formation, including but not limited to the linear oligoester diol and crosslinking agent. "Coating binder" means the polymeric part of the film of the coating after solvent has evaporated and after crosslinking. "Formulated coating" composition means the polymeric vehicle and optional solvents, as well as pigments, catalysts and additives which may optionally be added to impart desirable application characteristics to the formulated coating and desirable properties such as opacity and color to the film. "VOC" means volatile organic compounds.

As used herein "linear" means that the oligomer has a main longitudinal chain that is substantially without any side chain or group extending therefrom such that the longitudinal chain has only the chain segments having the structures —$CH_2$—, —O— and —C(=O)— with the longitudinal chain being terminated with —OH groups. In this context, "substantially without" means that the oligoester does not have more than about 3 percent of chain segments, other than —$CH_2$—, —O— and —C(=O)— and the terminating hydroxyl group, with a branch extending from them. Further, side chains should not raise the viscosity of the oligomer above the viscosity range of from about 0.1 to about 1.2 Pa.s at a temperature in the range of from about 20° C. to about 50° C. as measured on a Brookfield viscometer model DV-II+ using a SC4-31 spindle at 6 rpm.

"Diol" is a compound or oligomer with two hydroxyl groups. "Polyol" is a compound or oligomer with two or more hydroxyl groups.

"Solvent" means an organic solvent.

"Organic solvent" means a liquid which includes but is not limited to carbon and hydrogen and has a boiling point in the range of from about 30° C. to about 300° C. at about one atmosphere pressure.

"Dissolved" in respect to a polymeric vehicle, formulated coating composition or components thereof means that the material which is dissolved does not exist in a liquid in particulate form having at least about 5 weight percent particles having diameters greater than about 30 nM which are as measured by dynamic light scattering.

"Soluble" means a liquid dissolved in a liquid or a solid dissolved in a liquid.

"Miscible" means a liquid which is dissolved or is soluble in a liquid.

"Polydispersity index" (PDI) means the weight average molecular weight ($M_w$) divided by the number average molecular weight ($M_n$), PDI=$M_w/M_n$.

"Volatile organic compounds" are defined by the U.S. Environmental Protection Agency at 40 C.F.R. 51.000 of the Federal Regulations of the United States of America as any compound of carbon, excluding carbon monoxide, carbon dioxide, carbonic acid, metallic carbides or carbonates, and ammonium carbonate, which participates in atmospheric photochemical reactions.

This includes any such organic compound other than then following, which have been determined to have negligible photochemical reactivity: acetone; methane; ethane; methylene chloride (dichloromethane); 1,1,1-trichloroethane (methyl chloroform); 1,1,1-trichloro-2,2,2-trifluoroethane (CFC-113); trichlorofluoromethane (CFC-11); dichlorodifluoromethane (CFC-12); chlorodifluoromethane (CFC-22); trifluoromethane (FC-23); 1,2-dichloro-1,1,2,2-tetrafluoroethane (CFC-114); chloropentafluoroethane (CFC-115); 1,1,1-trifluoro 2,2-dichloroethane (HCFC-123); 1,1,1,2-tetrafluoroethane (HF-134a); 1,1-dichloro 1-fluoroethane (HCFC-141b); 1-chloro 1,1-difluoroethane (HCFC-142b); 2-chloro-1,1,1,2 -tetrafluoroethane (HCFC-124); pentafluoroethane (HFC-125); 1,1,2,2-tetrafluoroethane (HFC-134); 1,1,1-trifluoroethane (HFC-143a); 1,1-difluoroethane (HFC-152a); and perfluorocarbon compounds which fall into these classes:

(i) Cyclic, branched, or linear, completely fluorinated alkanes;
(ii) Cyclic, branched, or linear, completely fluorinated ethers with no unsaturations;
(iii) Cyclic, branched, or linear, completely fluorinated tertiary amines with no unsaturations; and
(iv) Sulfur containing perfluorocarbons with no unsaturations and with sulfur bonds only to carbon and fluorine. Water is not a VOC.

A "film" is formed by application of the formulated coating composition to a base or substrate, evaporation of solvent, if present, and crosslinking.

According to the invention, the liquid polymeric vehicle has at least about 80 to about 92 weight percent solids and comprises at least one linear oligoester diol having a number average molecular weight in the range of from about 275 to about 1200 which is effective for reaction with a crosslinker. The polymeric vehicle is thermosetting with the thermoset being achieved by the reaction of the linear oligoester diol and crosslinker with the application of heat. The latter reaction provides a coating binder of a paint coating. The oligoester diol may be liquid or solid at about 25° C., but if it is a solid it has a melting point of below about 50° C., preferably below about 40° C. The melting point is most preferably below about 10° C. The melting point of the oligoester diol is usually reduced after it is mixed with the crosslinker. Even so, it may be necessary in some cases to heat the coating composition to melt crystalline oligomers before its application. Control of the viscosity of the oligoester diol comes from at least two sources. First, the oligoester is linear with its main chain having only chain segments having the structures —$CH_2$—, —O— and —C(=O)— and the main chain being terminated with —OH groups. The linear longitudinal chain of the oligomer is substantially without any side chain or group. This linearity reduces the viscosity of the oligoester relative to an oligomer even with relatively small amounts of branching. As previously noted in this application "substantially without" means that the oligomer does not have more than about 3 weight percent of the chain segments, other than —$CH_2$—, —O— and —C(=O)— and the terminating hydroxyl group, with a branch extending therefrom. Side chains, if they exist, should not raise the viscosity of the oligoester above the range of about 0.1 to about 1.2 Pa.s as set forth above. Second, the number average molecular weight of the oligoester is controlled such that the oligoester has at most a small low molecular weight fraction which will be a source for evaporation or VOCs upon the application of heat for the thermosetting of the coating binder. Ii this connection the linear oligoester diol has a polydispersity index ($M_w/M_n$) of less than 2.6, preferably less than about 2.2 and preferably in the range of from about 1.4 to about 1.8, and most preferably less than about 1.4. Relative to its molecular weight the oligoester diol has a low viscosity (about 0.1 to about 1.2 Pa.s as set forth above) on the Brookfield viscometer which produces a shear rate of about 2 sec.$^{-1}$. The slow evaporation rate of the oligoester, its linearity and the control of the number average molecular weight such that unreacted monomers and oligoesters with molecular weights below about 250 are minimized are important factors such that the viscosity of the oligoester and the polymeric vehicle are sufficiently low to permit a formulated coating composition with a useable viscosity that permits its application without the addition of organic solvents.

The polydispersity index of the linear oligoester may be obtained by synthesizing the oligomer through a direct catalyzed esterification reaction, a catalyzed transesterification reaction or by a catalyzed esterification reaction using reactants such as dicyclohexyl-carbodiimide (DCC). Zinc acetate may be used as a catalyst in the transesterification reaction and a solution of p-toluenesulfonic acid in pyridine may be used as a catalyst in the reaction using DCC. Careful use of these techniques can yield products with a polydispersity index as low as 1.4. The polydispersity index may be lowered to levels below 1.4 by purification of the oligoester product such as by extraction of the volatile low molecular weight fractions or by vacuum stripping of such fractions. Using these techniques a polydispersity index of 1.1 or even lower may be obtained. Typical oligoester diols include the reaction products of linear aliphatic dicarboxcylic acids having not more than about 16 carbon atoms or esters thereof such as azelaic acid, glutaric acid, adipic acid, decanedioic acid, dodecanedioic acid, succinic acid, dimethyl azeleate, dimethyl glutarate, dimethyl succinate, dimethyl adipate, dimethyl decanedioate and dimethyl dodecandioate with one or more linear diols having not more than about 16 carbon atoms such as ethylene glycol, 1,3-propanediol, 1,4-butanediol, 1,5-pentanediol, 1,6-hexanediol, 1,9-nonanediol, diethylene glycol, triethylene glycol and tetraethylene glycol. As used herein, linear aliphatic dicarboxycylic acid means an acid with divalent segments having only the structures —$CH_2$—, —O— and —C(=O)— terminated with —COOH. As used herein linear diol means a diol with segments having the structures —$CH_2$— and —O— terminated with —OH. Mixtures of the acids or esters thereof and diols may be cotransesterified and may be used to achieve certain melting points and molecular weights. Examples of such mixtures include a cotransesterified mixture of dimethyl azeleate with equal weights of 1,4-butanediol and 1,6-hexanediol which provides a product having a viscosity of 0.65 Pa.s at 30° C.; a cotransesterified mixture of dimethyl azeleate and dimethyl adipate (1:1 molar ratio) and 1,4-butanediol with $M_n$=920 which mixture provides a viscosity of 0.72 Pa.s at 6 rpm at 25° C.; a cotransesterified mixture of dimethyl azeleate and diethyl dodecanedioate (1:1 molar ratio) with the diols 1,4-butanediol, diethylene glycol and 1,10-decanediol (2:1:1 molar ratio). A particularly useful oligoester diol may be prepared from 1,4-butanediol and a mixture of the dimethyl esters of HOOC($CH_2$)$_n$COOH, n=3, 4 and 7 in a 1:1:1 molar ratio to provide oligoester diols with number average molecular weights such as 310 and 520. Typical linear oligoesters which may be used in the invention have the general formulas:

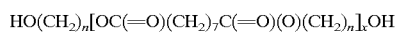

where n=2 to 12 and x=1 to 5;

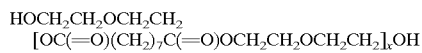

where x=1 to 5; and

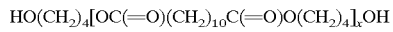

where x=1 to 4.

Even numbered diacids (acids having even numbers of carbon atoms) tend to provide oligomers with melting points which are too high, except when used in mixtures. For example, an oligomer made from 1,4-butanediol and dimethyl dodecandioate has a melting point of 60 to 65° C. and is poorly suited for use in solventless liquid coatings. Hence, acids which have an odd number of carbon atoms are preferred in a single acid type of composition and as a substantial component of a mixture. However, mixtures of different diacids and diols wherein the mixture includes a diacid and/or diol with an even number of carbon atoms may be used.

The oligoester diol may be a mixture of the chemically same or different oligoester diols which have differing number average molecular weights and which number average molecular weights are in the range of from about 275 to about 1200. In an important aspect, oligoester diols having the same chemical formula, but with differing number average molecular weights, are mixed to provide a polymeric vehicle according to the invention. Such mixtures may be used to improve the properties of the coating binder or the polymeric vehicle. For example, oligoester diols having the same formulas, but for number average molecular weight, when mixed to provide a blend of oligomers comprising 20 weight percent of an oligomer having an $M_n$ of about 500 and 80 weight percent of an oligomer having an $M_n$ of about 300 improves the impact resistance of a coating binder over a coating binder which is made using exclusively an oligomer which has an $M_n$ of about 300. Such blends of oligomers increase the PDI of the oligomeric diol such that the oligomeric blend used in a polymeric vehicle may approach 2.6. In general, without such blends, however, PDI of the oligoester diol used in the polymeric vehicles according to the invention should not have a PDI of more than about 2.2. Further, the lower the PDI while retaining coating properties, the better such that the PDI approaches 1.0.

As previously stated, the crosslinker has a functionality which is reactive with active hydrogens such as the hydroxyl groups of the oligoester. The crosslinker may be a polyisocyanate which generally is not blocked because blocking generally will raise the viscosity of the isocyanate such that it will not be functional or useful in the practice of the invention. Liquid blocked isocyanates may be used if the viscosity of the crosslinker or blend of crosslinkers is less than 3.0 Pa.s as described herein. Two useful polyisocyanate crosslinking agents which may be used in the invention include hexamethylene diisocyanate which has the structure shown below (HDI and sold commercially as Desmodur N-3200)

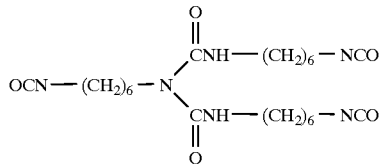

and a blend of polyisocyanates (sold commercially as Laxate XHD 0700 by Olin Corporation) with the following structures:

Luxate® XHD 0700

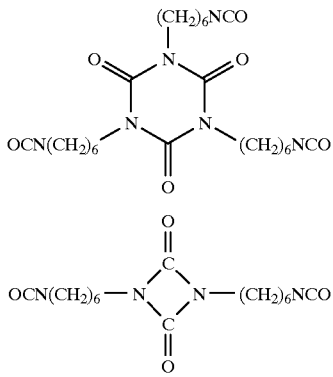

(Mixture)

Amino resins (usually made from amidines, ureas or amides by reaction with formaldehyde and subsequently usually with an alcohol) also may be used as a crosslinker which will react with the hydroxyls of the linear oligoester. Melamine resins are a subclass of amino resins and may also be referred to as "melamine-formaldehyde resin" or "alcoholated melamine-formaldehyde resin." Melamine resin amounts should be adjusted according to the molecular weight of the oligoester diol. As the molecular weight of the oligoester diol increases the equivalent weight ratio of melamine resin to total diol should be adjusted from about 1:1 to about 1.5:1 to about 1.7:1 and possibly higher to achieve desired film properties.

Suitable amino crosslinkers include, but are not limited to melamine formaldehyde types such as hexakis (methoxymethyl) melamine resin (HMMM) (sold as "Cymel 303" and "Resimene-747") and other amino resins as described in Wicks, Jones and Pappas "Organic Coatings: Science and Technology" PP 83–103, Wiley Interscience, 1992. Additionally, the crosslinker may be solid under certain conditions as long as it is soluble in the oligoester diol/crosslinker blend and does not increase the viscosity of the oligoester diol/crosslinker blend or formulated coating composition above the rages described herein. These crosslinkers include a hexakis (methoxymethyl) melamine (HMMM) resin which sometimes appears as a solid, is highly alkylated and has the general formula:

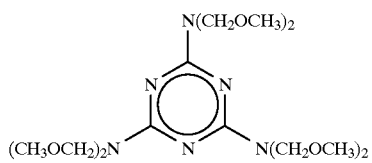

The latter HMMM resin appears as a waxy solid with a melting point in the range of about 30° C. and is sold by Cytec Chemical Company under the name Cymel 300. A similar melamine resin which sometimes appears to be a solid at about 25° C. and which can be used in the invention is a highly monomeric, highly methylolated hexamethylolated melamine formaldehyde resin which is sold by Monsanto Chemical Company under the designation HM-2612.

Properties of the coating binders resulting from the use of amino resin crosslinkers may be improved with hardeners additional to the aforedescribed crosslinkers. These additional hardeners include polyurethane diols. These diols include the urethane diols K-FLEX VE 320-100® and K-FLEX VD 320 W®. K-FLEX UD320-100 is a 100% polyurethane-diol with hydroxyl equivalent weight 160, viscosity 7.0 Pa.s at 50° C. Its structure is thought to be $HO(CH_2)_6OCONH(CH_2)_6NHCOO(CH_2)_6OH$. K-FLEX UD-320W has the same structure as K-FLEX UD320-100, is a polyurethane-diol contained about 10% by weight of water with hydroxyl equivalent weight 178, viscosity 8.0 Pa.s at 25° C. Both may be obtained from King Industries. These additional hardeners also include crystalline polyols such as

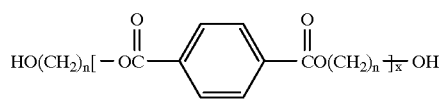

where
n=2 through 12 and
x=1 through 20;

$C(CH_2OH)_4$ and $RC(CH_2OH)_3$ where R is methyl, ethyl, propyl and butyl; and
$HOCH_2(CHOH)_4CH_2OH$.

Useful among these aromatic hardeners include 6GT

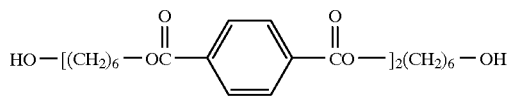

and 10GT

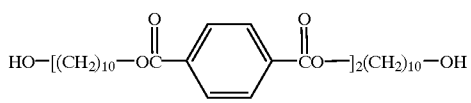

Yet another example of a crystalline polyol is 1,3,5-tri (hydroxyethyl) cyanuric acid (THECA), which has the structure

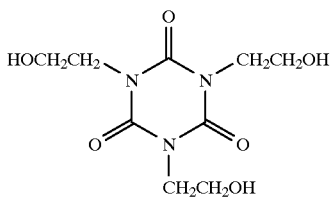

Mesogenic polyols, diesters of neopentyl glycol and parahydroxybenzoic acid which diesters are hereinafter referred to as AY-1, a preferred AY-1 diester having the structural formula

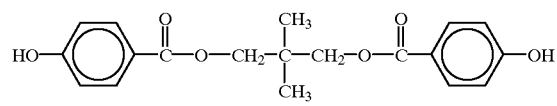

and phenolic ester alcohols (PHEAs) such as those having hydroxyl groups extending from the aromatic and aliphatic portion of the molecule also provide useful hardeners for the coating composition. Generally the $M_n$ or number average molecular weight for a PHEA is in the range of about 250 to about 1200. For a more complete description of mesogenic polyols see published PCT application no. US95/01058. These additional hardeners are especially useful if small amounts of organic solvents are used in the formulated coating composition. A useful PHEA has two ester groups, a phenolic hydroxy (which extends from the aromatic group), an aliphatic hydroxy and has the structural formula:

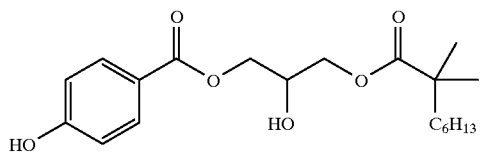

Amino resins by themselves without additives such as hardeners may not give desired film properties. The above-identified additional hardeners, especially PHEAs, are particularly useful with polymeric vehicles which include amino resins where each of the components are in amounts effective for providing a polymeric vehicle with the aforedescribed viscosity range and effective for providing a coating binder with a pencil hardness of at least about B at a thickness of about 1 mil dry. Isocyanates provide excellent film properties but may shorten the pot life of the polymeric vehicle or formulated coating composition.

A particularly useful crosslinker blend in the invention is a melamine sold as Cymel 1135 (a 50/50 methylated/butylated melamine with 70% monomeric; content obtained from Cytec Company) and Luxate XHD 0700 in a ratio of about 2.0 parts melamine to about 0.65 to about 0.22 parts Luxate. The crosslinker has an average functionality reactive with the hydroxyls of the oligoester of greater than about 2.4, a viscosity of less than about 3.0 Pa.s at about 25° C., and in an important aspect, is liquid at about 10° C. and is miscible with the oligoester.

The reaction between the oligoester and the crosslinker which provides the coating binder generally is a catalyzed reaction. Although a catalyst is not required for some isocyanate crosslinkers, typical catalysts for isocyanate crosslinking reactions include soluble zinc or tin catalysts such as dibutyl tin dilaurate, tertiary amines such as diazabicyclo[2.2.2] octane and zinc salts of organic acids. Typical catalysts for the amino resin crosslinking reactions include para toluene sulfonic acid (p-TSA), dodecyl benzene sulfonic acid and dinonyl nathphalene disulfonic acid. Typically the catalyst comprises from about 0.03 to about 0.5 weight percent of the blend of oligoester and crosslinker, based upon the weight of the oligoester, crosslinker and catalyst.

The polymeric vehicle comprises at least about a stoichiometric amount of crosslinker which will react with the hydroxyl groups of the oligoester. In general the polymeric vehicle comprises an oligoester diol and a crosslinker in an equivalent ratio in the range of from about 1.0:0.93 to about 1:2.5, diol to crosslinker. In an important aspect, the polymeric vehicle will have a viscosity of not more than about 1.2 Pa.s at the temperature of application, which usually is not more than about 50° C. and is preferably about 25° C. The polymeric vehicle and formulated coating composition provide a coating binder having a pencil hardness of at least about B when applied to a substrate at a thickness of about 1 mil dry.

The method of controlling the viscosity of the polymeric vehicle and formulated coating composition is practiced by providing the coating composition with the linear oligoester diol having the chain segments with the structures —$CH_2$—, —O— and —C(=O)—, which oligoester diol is within the molecular range and viscosity range as aforesaid with the oligoester also having a polydispersity index of less than about 2.6, preferably less than 2.2, preferably in the range of from about 1.4 to about 1.8 and most preferably less than 1.4 and mixing the oligoester with a crosslinking agent with the functionality and viscosity as aforesaid. Maintaining the linearity of the oligoester substantially without side chains, maintaining the polydispersity index and also providing a low viscosity liquid crosslinker which is miscible with the oligoester, and has the functionality and viscosity as aforesaid permits control of the viscosity of the coating composition without the use of organic solvents heretofore not previously known.

The formulated coating compositions are made by mixing the polymeric vehicle with pigments, catalysts and additives such as defoamers, pigment dispersants, anticratering agents and rheology modifiers. The formulated coating compositions have a viscosity of not more than about 1.2 at about 50° C. or less at shear rates which may range from about 1 sec.$^{-1}$ to about 100,000 sec.$^{-1}$ depending upon the method of application. The formulated coating composition may be applied to a substrate by spraying (which has very high shear rates), dipping (which has a low shear rate such as about 1 sec.$^{-1}$), roll coating, brushing (which may have shear rates of from about 1000 to abut 20,000 sec.$^{-1}$) or using other known application equipment and thereafter thermosetting the coating composition by the application of heat in the temperature range of from about 20° C. to about 30° C. for about 0.5 to about 60 minutes. Generally the formulated coating compositions will have less than 140 g/L VOCs under ASTM Test D-3960-93.

The following examples set forth compositions according to the invention and how to practice the method of the invention.

EXAMPLE I

Synthesis and Viscosity of Oligoester Diols

Synthesis of 1,4-butanediol azeleate ($A_1$) through transesterification with a stoichiometric amount of 1,4 butanediol.

$A_1$ is synthesized from dimethyl azeleate with 1,4-butanediol at a starting ratio of 2:3. The reaction involved is shown below.

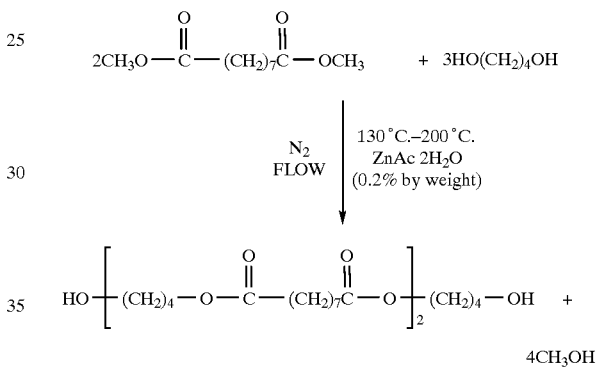

A 500-mL, 4-neck flask is equipped with a mechanical stirrer, Dean-Stark trap, condenser, thermometer and nitrogen inlet. Dimethyl azeleate (86.4 g, 0.4 mol), 1,4-butanediol (54 g, 0.6 mol) and zinc acetate dihydrate (0.2% of total wt.) are placed into the flask and gradually heated by an electrothermal heating mantle with controller from 130° C. to 170° C. during 3 hours. Nitrogen is bubbled through the solution to facilitate methanol removal. The temperature is then raised to 200° C. and maintained for one hour, as methanol is collected in the Dean-Stark trap. 94% Of the theoretical amount of methanol is collected during the 4 hours. A transparent liquid with low viscosity is obtained. Yield of the product ($A_1$) is about 95%.

The NMR spectra indicate that the $M_n$ is about 570. A significant NMR signal at 3.85 ppm for residual methyl group remaining in the oligomer solution is observed. The results in Table 1 describe the viscosity of $A_1$.

TABLE 1

| Viscosity of A1. | | | | | |
|---|---|---|---|---|---|
| Temp °C. | 25 | 30 | 35 | 40 | 50 |
| mPa.s* | 386 | 305 | 259 | 169 | 132 |

4-diol azelate ($A_1$): x = 2.0, Mn = 550
*milli Pascal-sec.

Table 2 describes the formulation of A1 and coatings based on $A_1$. As shown in Table 2, solvent (methyl ethyl ketone)

resistance of the coating film is bad for the formulation in which the ratio of A to Resimene 747 was 7 to 3 and was very good for the formulation in which the ratio of A to Resimene 747 was 6 to 4. Resimene 747 is a fully methylated monomeric melamine resin in which hexakis (methoxymethyl) melamine is a representative structure (obtained from Monsanto Chemical Company). Other properties are shown in Table 2.

TABLE 2

Formulation and properties of coatings based on $A_1$.

| $A_1$ | 70 phr* | 60 phr |
|---|---|---|
| Resimene 747 | 30 phr | 40 phr |
| p-TSA | 0.5 phr | 0.5 phr |
| Cure temp/cure time | 150° C./30 min. | 150° C./30 min. |
| Direct impact lb-in | 80 | 60 |
| Pencil hardness | B-HB | HB |
| Adhesion** | OB | OB |
| MEK resistance, double rubs*** | 100 | 200 |

*phr means part per hundred.
**As per test ASTM D 3359-87. Unless otherwise stated, adhesion was measured using this test.
***MEK = methyl ethyl ketone.

Synthesis of 1,4-butanediol azeleate (A 2) through transesterification with excess 1,4-butanediol.

In order to eliminate the remaining methyl groups noted in the above described method and to study the relationship between viscosity and MN, the transesterification reaction is done in the following way:

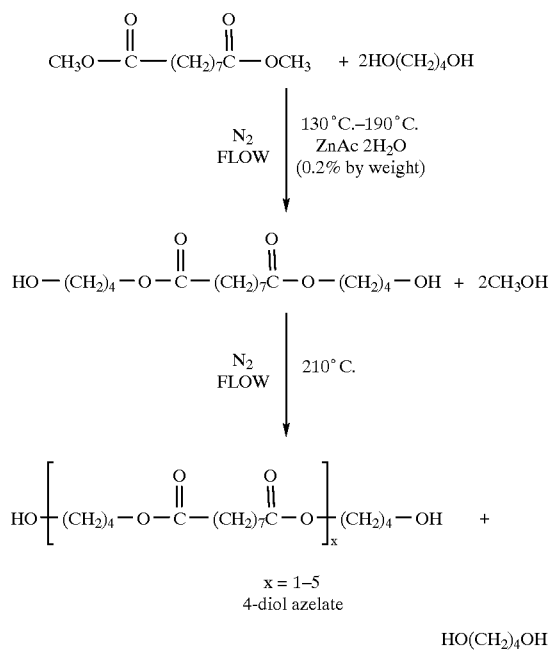

x = 1–5
4-diol azelate

For $A_2$ when x=1, $M_n$=332, and when x=5, $M_n$=1300.

A 500-mL, 4-neck flask is equipped with a mechanical stirrer, Dean-Stark trap, condenser, thermometer and nitrogen inlet. Dimethyl azeleate (130 g, 0.6 mol), 1,4-butanediol (108 g, 1.2 mol) and zinc acetate dihydrate (1.2% of total wt.) are placed into the flask and are gradually heated by an electrothermal heating mantle with controller from 130° C. to 170° C. during 3 hours. The temperature then is raised to 200° C and maintained for one hour, as methanol is collected in the Dean-Stark trap. Nitrogen is fed slowly through the solution to help methanol removal, and 91% of the theoretical amount of methanol is collected during 4 hours. 20 g of the product (x=1) is taken out from the flask.

The temperature is raised to 210° C. and the flow rate of nitrogen is increased to help 1,4-butanediol (presumably formed by transesterification) removal. Five portions of products (each 20 g) with different molecular weights were removed. The molecular weight is controlled by the amount of collected 1,4-butanediol.

In a subsequent experiment $A_2$ with $M_n$ of 695 was made in a batch by collecting 36 mL of 1,4-butanediol.

Properties of Fractions of $A_2$ with Different $M_n$ Derived from Dimethyl Azeleate with 1,4 Butanediol through Transesterification.

Six fractions of $A_2$ with different $M_n$ were investigated. The degree of polymerization and $M_n$ were measured by NMR spectra. The average number of repeating units x in the oligoester can be calculated from the NMR peak area ratio of the methylene connected with the ester group ($-CH_2-O-CO-$) at 4.0 ppm to the methylene connected with the hydroxy group ($-CH_2-OH$) at 3.5 ppm.

$$x = \frac{\text{Area}(-CH_2-O-CO-)}{\text{Area}(-CH_2-OH)}$$

where x is the repeating unit in the oligomer. $M_n$ for A can be calculated by the following equation:

$$M_n = x[MW(\text{diacid}) + MW(\text{diol}) - 2(18)] + MW(\text{diol})$$

where MW(diacid) and MW(diol) are the molecular weights of the monomers, azelaic acid and 1,4-butanediol, respectively. $M_n$ of the fractions of $A_2$ are listed in Table 3. The viscosities of the oligomers are listed in Table 4. It was found that the viscosity of the oligomers was directly affected by their molecular weights and increased quickly as the molecular weight increased. Since some oligomers with increased molecular weights crystallize at room temperature (25° C.), all oligomers were warmed first and cooled down to room temperature right before viscosity measurements. According to the viscosity (Table 4), non-volatile weight (NVW) (Table 3) and the NMR spectra of these six oligomers ($A_2$), it was found that the best candidate for solventless coating resin was $A_2$ of portion 4 with $M_n$ of 695. The absence of a peak for the residual methyl groups in the NMR spectrum confirmed that the transesterification was complete. Its NVW (97.8%) means that relatively small amounts of small molecules will evaporate during baking. The viscosity of $A_2$ ($M_n$=695) was about 700 mPa.s.

TABLE 3

Degree of polymerization x, $M_n$, and NVW of the six portions of oligomers as measured by NMR

| Portion | 1 | 2 | 3 | 4 | 5 | 6 |
|---|---|---|---|---|---|---|
| x | 1 | 1.4 | 1.9 | 2.5 | 3.5 | 5.5 |
| $M_n$ | 332 | 428 | 550 | 695 | 937 | 1421 |
| NVW% | 93.8 | 95.3 | 97.1 | 97.8 | 98.5 | 98.5 |

TABLE 4

Viscosities (mPa · s)* of the six portions of $A_2$ at different temperatures

| | Portion | | | | | |
|---|---|---|---|---|---|---|
| | 1 | 2 | 3 | 4 | 5 | 6 |
| 25° C. | 190 | 291 | 364 | 700 | 1000 | 1980 |
| 30° C. | 179 | 269 | 323 | 648 | 910 | 1820 |
| 35° C. | 154 | 217 | 300 | 529 | 770 | 1782 |
| 40° C. | 135 | 176 | 261 | 420 | 520 | 707 |
| 45° C. | 113 | 134 | 182 | 305 | 431 | 644 |
| 50° C. | 79 | 94 | 89 | 197 | 270 | 419 |

*milli Pascal-sec.

The mechanical properties of coatings of oligoester $A_2$ are shown in Table 5 for Formulation I and in Table 6 for Formulation II. Comparing properties of the two formulations, it can been seen that the film hardness and MEK solvent resistance of Formulation II were better than that of Formulation I. In Formulation II, the film of the oligomers with low $M_n$ was harder than that with higher $M_n$, because the oligomer of low molecular weight may give relatively high crosslinking densities in a crosslinked network. It was noted that all coating films had poor adhesion on untreated steel panels, but they have generally good adhesion on primed or pretreated steel panels.

TABLE 5

Mechanical properties of the six portion $A_2$
in solventless coating formulation I
($A_2$/Resimene 747 = 7/3)

| | Portion | | | | | |
|---|---|---|---|---|---|---|
| | 1 | 2 | 3 | 4 | 5 | 6 |
| Pencil Hardness | HB | HB | B | B | B-HB | B |
| Direct Impact* | 20 | 60 | 60 | 60 | 80 | 80 |
| Solvent Resist. | 80 | 100 | 80 | 80 | 80 | 100 |
| Adhesion | OB | OB | OB | OB | OB | OB |

*Films appeared to pass higher impact levels at first, but failed two days after impact test was performed.

TABLE 6

Mechanical properties of the six portion $A_2$
in solventless coating formulation II
($A_2$/Resimene 747 = 6/4)

| | Portion | | | | | |
|---|---|---|---|---|---|---|
| | 1 | 2 | 3 | 4 | 5 | 6 |
| Pencil Hardness | 2H | 2H | HB | HB | F | HB |
| Direct Impact | 60 | 60 | 60 | 60 | 60 | 60 |
| MEK Resistance | 200 | 200 | 200 | 200 | 200 | 200 |
| Adhesion on Steel* | OB | OB | OB | OB | OB | OB |
| Adhesion on Primed** | 5B | 5B | 5B | 5B | 5B | 5B |

*Adhesion on untreated steel panel.
**Adhesion on primed steel panel. Pencil hardness and impact on untreated steel panel.

COMPARATIVE EXAMPLE I

Non-linear oligoester diol derived from 2,2-dimethyl-1,3-propanediol with dimethyl azeleate The reaction to make the non-linear oligoester diol, which will be labeled PA, is shown below.

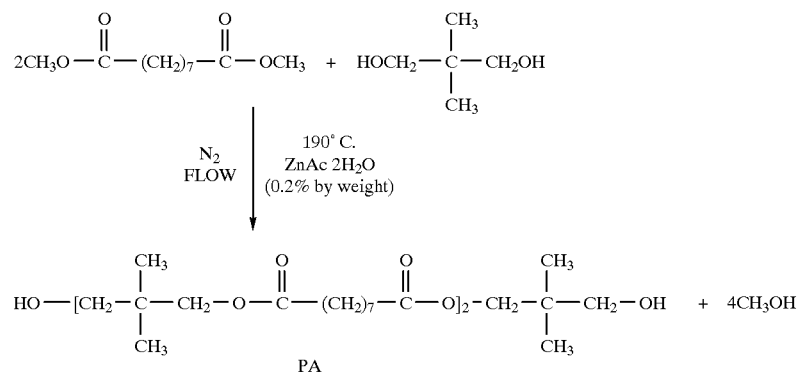

A 500-mL, 4-neck flask is equipped with a mechanical stirrer, Dean-Stark trap, condenser, thermometer and nitrogen inlet. Dimethyl azeleate (864 g, 0.4 mol), 2,2-dimethyl-1,3-propanediol (54 g, 0.6 mol) and zinc acetate dihydrate (0.2% of total wt) are placed into the flask and gradually are heated by an electrothermal heating mantle with controller from 130° C. to 170° C. for 5 hours. The temperature is then raised to 190° C. and maintained for two hours, as methanol is collected in the Dean-Stark trap. Nitrogen is fed slowly through the solution to help methanol removal and 90% of theoretical amount of methanol is collected during the 7 hours. A transparent liquid is obtained. Yield of the product is about 95%. Molecular weight is determined by NMR; x=2.4, $M_n$=718. NMR indicates that a small level of methyl groups remained in the material.

Properties of the Oligoester Diol (PA) and a
Comparison of PA with a Linear Oligomer In order to compare the viscosity of an oligoester diol with methyl side chain such as PA with linear oligoester diol ($A_2$) with $M_n$ of 695, the $M_n$ of the above non-linear diol was controlled at 718, close to 695. Degree of polymerization, $M_n$, and NVW of PA are shown in Table 7. Comparison of the viscosity of PA with $A_2$ ($M_n$=695) at different temperatures is listed in Table 8. The results indicate that the viscosity of oligoester diol (PA) was about twice as high as that of linear oligoester diol $A_2$ ($M_n$=695). This result provides evidence that unbranched, linear chains have the lowest viscosity.

TABLE 7

Degree of polymerization x, $M_n$, and NVW of oligoester diol PA.

| Degree of polymerization x | 2.4 |
|---|---|
| $M_n$ | 718 |
| NVW% | 99.1 |

TABLE 8

Comparison of viscosity of PA with $A_2$ ($M_n$ = 695) (mPa · s)

| Temperature | 25 | 30 | 35 | 40 | 45 | 50 |
|---|---|---|---|---|---|---|
| PA $M_n$ = 718 | 1550 | 1180 | 822 | 627 | 492 | 350 |
| $A_2$ $M_n$ = 695 | 700 | 648 | 529 | 420 | 305 | 197 |

EXAMPLE II

Synthesis of oligoesters from dimethyl azeleate and other linear diols; viscosity of oligoesters These oligomers were synthesized using a procedure essentially identical to that described above for synthesis of $A_2$ (Example I). Molecular weights ($M_n$) were measured by NMR. As shown in Table 9, most of the products proved to be low-melting solids at room temperature. Viscosities of the materials were measured as described above using supercooled liquids when possible, or when crystallization rates were fast, at temperatures just above the melting points. Oligomers were essentially colorless except for the oligomer made from diethylene glycol.

TABLE 9

Compositions, melting points, $M_n$'s and viscosities of oligomers made from dimethyl azeleate and linear diols.
HO(CH$_2$)$_n$[OOC(CH$_2$)$_7$COO(CH$_2$)$_n$]$_x$OH

| n | melting point, °C. | $M_n$ (NMR) | Viscosity Pa.s/rpm @ °C. |
|---|---|---|---|
| 2 | 25–30 | 620 | 0.23/6 @ 30 |
| 3 | 34–38 | 540 | 0.48/6 @ 40 |
| 4 | <40 | 700 | 0.70/6 @ 25 |
| 5 | 39 | 670 | 0.62/6 @ 25 |
| 6 | 39 | 600 | 0.53/6 @ 40 |
| | HO(CH$_2$)$_2$O(CH$_2$)$_2$[OOC(CH$_2$)$_7$COO (CH$_2$)$_2$OCH$_2$)$_2$]$_x$OH | | |
| — | <25 | 540 | 0.42/6 @ 25 |

EXAMPLE III

Synthesis of oligomers from 1,4-butanediol and mixtures of linear dicarboxycylic methyl esters These oligomers were synthesized using a procedure essentially identical to that described above for synthesis of $A_2$ (Example 1). Except as noted, the linear diesters in the mixtures were used in a 1:1 mol ratio. Molecular weights ($M_n$) were measured by NMR. As shown in Table 10, the products proved liquids at room temperature. Viscosities were measured at 25° C.

The dimethyl azeleate used in these experiments was a redistilled, commercial (Aldrich) product having a composition, as determined by gas chromatography/mass spectroscopy, of the dimethyl esters of heptanedioic (1.8%), octanedioic (4.1%), azeleic (83.6%), decanedioic (3.5%) and undecanedioic (7.1%) acids. "DBE-3" and "DBE-5" are products of the duPont Company; they are said to be mixtures of the dimethyl esters of succinic (SA), glutaric (GA) and adipic (AA) acids in the following proportions: DBE-3: SA, <1%; GA, 5–15%; AA, 85–95%. DBE-5 is said to be >98.5% pure dimethyl glutarate. The products are liquid at 25° C. and are solids at 0° C.

TABLE 10

Compositions and viscosities of oligomers made from mixtures of dimethyl esters of linear dicarboxycyclic acids and 1,4-butanediol.

| Diesters, (mol ratio) | $M_n$ (NMR) | Viscosity Pa.s/rpm @ °C. |
|---|---|---|
| Azeleate + adipate (1:1) | >490 | 0.72/6 @ 25 |
| Azeleate + DBE-3 + DBE-5 (1:1:1) | >570 | 0.65/6 @ 25 |

EXAMPLE IV

Properties of unpigmented coatings made from selected oligomers

Promising oligomers from Examples II-III were formulated into unpigmented coatings with a triisocyanate crosslinker, Desmodur N-3200, a product of Miles Chemical Company. The crosslinker is stated to have a viscosity of 1.3 to 2.2 Pa.s at 25° C.

The three oligoesters used in these experiments and their $M_n$'s and viscosities in Pa.s at 6 rpm with a Brookfield viscometer described above were:

| | $M_n$ | Pa · s |
|---|---|---|
| IV-1 Dimethyl azeleate/diethylene glycol (Example II) | 540 | 0.42 @ 25° C. |
| IV-2 Dimethyl azeleate/1,4-butanediol + 1,6-hexanediol (Example II) | >608 | 0.65 @ 30° C. |
| IV-3 Dimethyl azeleate + dimethyl adipate/1,4-butanediol (Example III) | 920 | 0.72 @ 25° C. |

The $M_n$ of oligoester IV-2 is reported at >608 because the molecular weight cannot be exactly calculated from end group analysis without knowing the proportions of the two diols incorporated in the product. It is probably only slightly above 608.

In each case, an equivalent ratio of isocyanate/hydroxyl was 1.3/1.0. No catalyst was added, but it was considered that the crosslinking reaction was catalyzed by the zinc catalyst residues dissolved in the ester oligomer. Evidence for this was that the viscosity of the formulated coating began to increase as soon as the formulation was made. For this reason, it was not possible to make reliable measurements of the formulation viscosity. The values shown are higher than the initial viscosities.

The formulated coatings were drawn down on iron phosphate pretreated steel test panels with a wire-wrapped bar and baked at a temperature of 120° C. for one hour. The coatings were tested using the procedures described above.

TABLE 11

Formulations and properties of unpigmented coatings.

|  | IV-1 | IV-2 | IV-3 |
|---|---|---|---|
| Oligoester, g (meq) | 4 (14.8) | 4 (13.2) | 4 (8.7) |
| Isocyanate g (meq) | 3.48 (19.3) | 3.09 (17.1) | 2.05 (11.3) |
| Wt. % solids, measured | 99.2 | 99.6 | 99.2 |
| Viscosity, Pa.s/rpm @ °C. | 2.7/3 @ 28 | 1.2/6 @ 27 | 3.4/6 @ 23 |
| Film thickness um | 20–23 | 20–23 | 22–25 |
| Impact resistance Direct/Reverse (in/lb) | 160/160 | 160/160 | 160/160 |
| Pencil Hardness | 1H-2H | 1H-2H | 1H-2H |
| MEK rub resist., rubs | >200 | >200 | >200 |
| Adhesion, ASTM-D3359-87 | 5B | 5B | 4B-5B |
| Appearance | transparent | transparent | transparent |

EXAMPLE V (a) Formulations of an Oligoester Diol based upon 1,4-Butanediol crosslinked with Polyisocyanate and mixed with Titanium Dioxide An oligoester was made by reacting 1,4-butanediol with a mixture of dimethyl esters of $HOOC(CH_2)_nCOOH$ diacids, n=3, 4 and 7 in a 1:1:1 molar ratio. The procedure followed was essentially like those used to make $A_2$. The product was vacuum stripped at 30° C. to provide a product with an $M_n$300. The film properties of the oligoester diol crosslinked with isocyanate are described in Table 12 below.

TABLE 12

| Oligoester-diol ($M_n$ = 300) | $M_n$300 | $M_n$300 | $M_n$300 | $M_n$300 |
|---|---|---|---|---|
| Wt/mmol/meg. wt | 2.67/8.61/17.22 | as left | 2.0/6.45/12.9 | as left |
| Crosslinker | Luxate XHD O700 | " | Luxate XHD O700 | " |
| Wt/meg. wt. | 4.19/22.39 | " | 3.10/16.77 | " |
| $TiO_2$ | DuPont R 700 | " | DuPont R 700 | " |
| (percentage of binders) % | 19.39 | " | 58.41 | " |
| BYK-077 (Defoamer)* | 0.5% | ** | 0.5% | " |
| Panel | Q-PHOS R-36-1 | Q-Panel R-36 | Q-PHOS R-36-1 | Q-Panel R |
| Film thickness (mil) | 2–4 | 2–3 | 2.0–2.2 | 1.5–1.8 |
| Direct Impact (lb-in) | 160 | 160 | 160 | 160 |
| Reverse Impact (lb-in) | 160 | 160 | 160 | 160 |
| Pencil Hardness | >4H | >4H | 5H | 5H |
| MEK Rub Resistance | >200 | >200 | >200 | >200 |
| Adhesion | 5B | 5B | 5B | 5B |
| Appearance | white | white | white | white |

*Percentage of the total weight
**Q-PHOS is a mark under which phosphated steel panels are sold. These panels were used in the test described herein.

(b) Formulations of an Oligoester Diol based upon 1,4-Butanediol crosslinked with Melamine and mixed with Titanium Dioxide The oligoester diol described in Example V (a) was mixed with titanium dioxide and crosslinked with a melamine formaldehyde resin. The film properties were studied as described in Table 13 below:

TABLE 13

| Oligoester-diol | V (a) | V (a) |
|---|---|---|
| wt/ | 3.0 g | 3.0 g |
| Crosslinker | Cymel 1135 | Cymel 1135 |
| Wt/ | 3.0 g | 3.0 g |
| $TiO_2$ | DuPont R 700 | DuPont R 700 |
| (percentage of binders) | 50% | 50% |
| DNN DSA*[a] | 1% | 1% |
| BYK-077 (Defoamer)* | 0.5% | 0.5% |
| Panel | Q-PHOS R-36-1 | Q-Panel R-36 |
| Film thickness (mil) | 1.5–1.8 | 1.3–1.5 |
| Direct Impact (lb-in) | <60 | <60 |
| Reverse Impact (lb-in) | <60 | <60 |
| Pencil Hardness | 6H | 6H |
| MEK Rub Resistance | >200 | >200 |
| Adhesion | –2B | B |
| Appearance | white | white |

*Percentage of the total weight.
[a]Dinonylnaphthalene disulfonic acid.

EXAMPLE VI (a) Formulations of an Oligoester Diol ($M_n$520) based upon 1,4-Butanediol crosslinked with Melamine and mixed with Titanium Dioxide An oligoester diol was made by reacting 1,4-butanediol and a mixture of dimethyl esters of $HOOC(CH_2)_nCOOH$ diacids, n=3, 4 and 7 in a 1:1:1 molar ratio. The number average weight ($M_n$) was 520, and the oligoester had a viscosity of 0.64 Pa.s at 25° C. and had 98.7% solids as measured under ASTM D-2369. The film properties of the oligoester ($M_n$520) crosslinked with a melamine formaldehyde resin were studied as described in Table 14 below.

TABLE 14

| Oligoester-diol ($M_n$520) | $M_n$520 | $M_n$520 | $M_n$520 |
|---|---|---|---|
| Wt/ | 3.0 g | as left | as left |
| Crosslinker | Cymel 1135 | " | " |
| Wt/ | 2.0 g | 2.5 g | " |
| $TiO_2$ | DuPont R 700 | as left | " |
| (percentage of binders) | 60% | 54.54% | " |
| Solvent (MEK)* | — | — | 10% |
| BYK-077 (Defoamer)* | 0.5% | as left | as left |
| DNNDSA*[a] | 1% | " | " |
| Panel | Q-PHOS R-36-1 | " | " |
| Film thickness (mil) | 1.3–1.6 | 1.3–1.6 | 1.2–1.3 |
| Direct Impact (lb-in) | >80 | >80 | >100 |
| Reverse Impact (lb-in) | <40 | <40 | <60 |
| Pencil Hardness | 3H | 3H | 3H |
| MEK Rub Resistance | >200 | >200 | >200 |
| Adhesion | 2B | 2B | 3B |
| Appearance | white | white | white |

*Percentage of the total weight
[a]Dinonylnaphthalene disulfonic acid.

(b) Formulations based upon the Oligoester of Example VI (a) crosslinked with a Melamine Isocyanate Blend and Titanium Dioxide The oligoester diol described in Example VI (a) was mixed with $TiO_2$ and crosslinked with a mixture of melamine formaldehyde and polyisocyanate crosslinkers in weight ratios of 2.0/0.65 to 2.0/0.22 (melamine resin/isocyanate), the polyisocyanate blend being sold as Luxate XHD 0700. The film properties were studied as described in Table 15 below.

TABLE 15

| Oligoester-diol | VI (a) | VI (a) |
|---|---|---|
| Wt/ Crosslinker (Cymel 1135 Luxate XHD O700) | 3.0 g | as left |
| Wt/wt | 2.0/0.65 | 2.0/0.22 |
| $TiO_2$ | DuPont R 700 | as left |
| (percentage of binders) | 53% | 57.5% |
| Solvent (MEK)* | 0 | 0 |
| BYK-077 (Defoamer)* | 0.5% | 0.5% |
| DNNDSA*[a] | 1% | 1% |
| Panel | Q-PHOS R-36-1 | as left |
| Film thickness (mil) | 1.0–1.1 | 1.0 |
| Direct Impact (lb-in) | 120 | 120 |
| Reverse Impact (lb-in) | 100, >60 | >60 |
| Pencil Hardness | 4H | 3H |
| MEK Rub Resistance | >200 | >200 |
| Adhesion | 4B–5B | 3B–4B |
| Appearance | white | white |

*Percentage of the total weight.
[a]Dinonylnaphthalene disulfonic acid.

EXAMPLE VII

(a) Formulations of Oligoester Diol with Melamine Resin and Polyurethane-Diols A series of linear oligoester-diols with different molecular weights ($M_n$) were synthesized using a procedure essentially identical to that described in Example I. Molecular weights ($M_n$) were measured by NMR. Viscosities were measured at 25° C.

The following compounds were used in formulations of the oligoester-diol. K-FLEX UD320-100, was a 100% polyurethane-diol with hydroxyl equivalent weight 160 and viscosity 7.0 Pa.s at 50° C. Its structure is HO $(CH_2)_6$OCONH$(CH_2)_6$NHCOO$(CH_2)_6$OH. K-FLEX UD-320W, having the same structure as K-FLEX UD320-100, was a polyurethane-diol containing about 10% by weight of water with hydroxyl equivalent weight 178, viscosity 8.0 Pa.s at 25° C. Both were obtained from King Industries.

Cymel 1135, a 50/50 methylated/butylated melamine, with 70% monomeric content, was obtained from Cytec Co. Resimene 797, a modified methylated melamine resin, and Resimene HM2612, 100% methylated melamine with >90% monomeric content, were obtained from Monsanto Chemical Company.

Catalyst dinonyl naphthalene disulfonic acid (DNNDSA) in isobutanol was obtained from King Industries ("Nacure-155").

Defoamers BYK-077 and leveling additive BYK-358 were obtained from BYK Chemie.

The formulations were prepared by blending oligoester-diol, crosslinker, catalyst, and additive together.

Films were prepared by casting the blended solution on a panel by a 26# wire—wound draw bar and baking in an oven at 150° C. for 30 minutes unless otherwise stated.

Pencil hardness was measured according to ASTM D3364-74 standard test method for film hardness by pencil test. Impact resistance, either direct or reverse impact, was measured according to the ASTM D2794-84 standard test method for resistance of organic coatings to the effects of rapid deformation (Impact). Resistance to methyl-ethyl-ketone (MEK) was measured by double rubbing with MEK saturated non-woven paper ("Kim-Wipe"). The non-woven paper was kept saturated by MEK during the measurement. Dry film thickness was measured by an Elcometer Model 300 thickness gauge. Adhesion was measured according to ASTM standard (Designation: D3359-87, test method B-cross-cut tape test). VOC and NVW were measured according to ASTM standard test method for volatile content of coatings (Designation D2369-87).

Film properties are described in Table 16.

TABLE 16

Formulation of Oligoester-diol ($M_n$735) and Polyurethane-diol with Melamine Resin

| Oligoester-diol | $M_n$735 | $M_n$735 |
|---|---|---|
| Wt (g)/meq./ wt. | 2.0/5.43 | 2.0/5.43 |
| Polyurethane-diol | UD320-100** | UD320W** |
| Wt (g)/meq. wt. | 1.0/6.25 | 1.0/5.625 |
| Cymel 1135 wt.(g)/ meq. wt. | 1.615/18.78 | 1.615/18.78 |
| Wt. ratio of Melamine/diol | 3.5/6.5 | 3.5/6.5 |
| Eq. wt. ratio of Melamine/diol | 1.61 | 1.70 |
| BYK-358* | 0.5% | 0.5% |
| DNNDSA | 1% | 1% |
| Panel | Q-PHOS R-36-1 | Q-PHOS R-36-1 |
| Film thickness (mil) | 0.8–1.0 | 0.8–1.0 |
| Direct Impact (lb-in) | 60 | ≈80 |
| Reverse Impact (lb-in) | ≈20 | ≈20 |
| Pencil Hardness | 4H | 4H |
| MEK Rub Resistance | >200 | >200 |
| Adhesion | 2B | 2B–3B |
| Appearance | Transparent | Transparent |

*Percentage of the total weight.
**UD320-100, K-FLEX-UD320-100; UD320W, F-FLEX-UD320W.

The affect of variations in the molecular weight of the oligoester-diol on the film properties provided by the formulations were as follows:

TABLE 17

Formulation of Oligoester-diol of different MW with Polyurethane-diol and Melamine Resin

| Oligoester-diol $M_n$ | 300 | 520 | 735 |
|---|---|---|---|
| wt (g)/meq. wt. | 2.0/13.33 | 2.0/7.69 | 2.0/5.44 |
| Polyurethane-diol UD 320W Wt (g)/meq. wt. | 1.0/5.625 | 1.0/5.625 | 1.0/5.625 |
| Cymel 1135 wt. (g)/meq. wt. | 2.45/28.48 | 1.72/19.98 | 1.55/18.04 |
| BYK-358* | 0.5% | 0.5% | 0.5% |
| DNNDSA | 1% | 1% | 1% |
| Panel | Q-PHOS R-36-1 | Q-PHOS R-36-1 | Q-PHOS R-36-1 |
| Film thickness (mil) | 1.0–1.2 | 1.0–1.1 | 1.1 |
| Direct Impact (lb-in) | >20 | >40 | >60 |
| Reverse Impact (lb-in) | ≈10 | ≈10 | ≈10 |
| Pencil Hardness | 5H | 4H | 3H |
| MEK Rub Resistance | >200 | >200 | >200 |
| Adhesion | 2B–3B | 2B–3B | 2B–3B |
| Appearance | Transparent | Transparent | Transparent |

*Percentage of the total weight.

TABLE 18

Formulation of Oligoester-diol of different MW with Polyurethane-diol and Melamine Resin

| Oligoester-diol $M_n$ | 840 | 1600 | 1600 |
|---|---|---|---|
| wt (g)/meq/wt. | 2.0/4.76 | 2.0/2.5 | 2.0/2.5 |
| Polyurethane-diol UD 320W | 1.0/5.625 | 1.5/58.44 | 1.5/8.44 |
| Wt (g)/meq. wt. | | | |
| Melamine | cymel 1135 | cymel 1135 | Resimene 797 |
| wt. (g)/meq. wt. | 1.33/15.49 | 1.49/17.33 | 1.3/ |
| BYK-358* | 0.5% | 0.5% | 0.5% |
| DNNDSA | 1% 1% | 1% | |
| Panel Q-PHOS | Q-PHOS | Q-PHOS | |
| | R-36-1 | R-36-1 | R-36-1 |
| Film thickness (mil) | 1.0–1.1 | 1.0 | 1.0–1.1 |
| Direct Impact (lb-in) | >80 | 60 | >80 |
| Reverse Impact (lb-in) | ≈20 | 10 | ≈40 |
| Pencil Hardness | ≈2H | 2H | 2H |
| MEK Rub Resistance | >200 | >200 | >200 |
| Adhesion | 4B | 3B–4B | ≈5B |
| Appearance | Transparent | Transparent | Transparent |

*Percentage of the total weight.

EXAMPLE VIII

Formulations of Linear Oligoester Diol with Hardeners and Crosslinkers

A series of linear oligoester-diols with different molecular weights ($M_n$) were synthesized using a procedure essentially identical to that described in Example III. Molecular weights ($M_n$) were measured NMR. Viscosities were measured at 25° C.

Hardeners used in the formulations were as follows: Aromatic oligoester diol 6GT and 10GT were synthesized with the following structure.

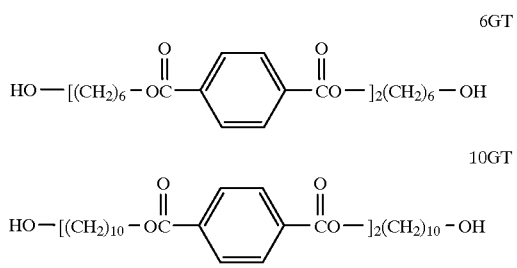

1,3,5-Tri (hydroxyethyl) cyanuric acid (THECA) 97%, was obtained from Aldrich Chemical Company. AY-1, a diester of neopentyl glycol (NPG) esterified by parahydroxybenzoic acid (PHBA), having the structures below. THECA

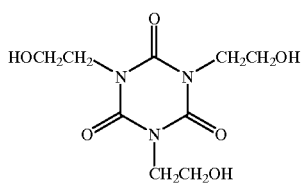

-continued

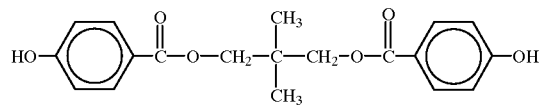

Dispersant Solsperse 24000, a polyester/polyamine copolymer, with m.p. of 47.5° C., was obtained from United Color Technology, Inc.

All other adhesives are described in Example VII.

Hardeners were dissolved in the oligoester-diol—melamine resin blend at 150° C. along with a "Hyperdispersant" stabilizer, Solsperse 24000, and then cooled with stirring to give a dispersion of fine particles. After cooling, catalyst was added and the dispersions were cast as a film and baked at 150° C. for 30 minutes.

All other procedures used for preparing the formulations and test film properties are described in Example VII.

(a) Formulations of an Oligoester Diol with Hardeners, Polyurethane Diol and Melamine Resins Tables 19–20 describe formulation of the oligoester-diols of Example III with varying molecular weights with hardeners, polyurethane diol and melamine.

TABLE 19

Formulation of Oligoester-diol of Different MW with Hardener, Polyurethane-diol and Melamine Resin

| Oligo-diol MW | 300 | 520 | 735 | 840 |
|---|---|---|---|---|
| wt (g)/meq. wt | 2.0/13.33 | 2.0/7.69 | 2.0/5.44 | 2.0/4.76 |
| Polyurethane diol UD320 W wt (g)/meq. wt | 0.5/2.813 | 0.5/2.813 | 0.5/2.813 | 0.5/2.813 |
| Hardener (I) THECA wt (g)/meq. wt | 0.25/2.87 | 0.25/2.87 | 0.25/2.87 | 0.25/2.87 |
| Hardener (II) 6GT wt (g)/meq. wt | 0.25/0.81 | 0.25/0.81 | 0.25/0.81 | 0.25/0.81 |
| Cymel 1135 wt (g)/meq. | 1.62/18.77 3.5/6.5 | 1.62/18.77 3.5/6.5 | 1.62/18.77 3.5/6.5 | 1.62/18.77 3.5/6.5 |
| wt. ratio** | 0.947 | 1.323 | 1.57 | 1.67 |
| eq. wt. ratio** | | | | |
| Solsperse - 24000* | 1% | 1% | 1% | 1% |
| BYK-358* | 0.5.% | 0.5% | 0.5% | 0.5% |
| DNNDSA* | 1% | 1% | 1% | 1% |
| Panel | Q-PHOS R-36-1 | Q-PHOS R-36-1 | Q-PHOS R-36-1 | Q-PHOS R-36-1 |
| Film-thick (mil) | 1.0 | 09–1.0 | 1.0–1.1 | 1.0–1.1 |
| Direct Impact (lb-inch) | >40 | >60 | >80 | >80, ≈120 |
| Reverse Impact (lb-inch) | <20 | >20 | <40 | ≈40 |
| Pencil-hard | ≈6H | 5H–6H | 3H–4H | 2H |
| MEK Rub Resist. | >200 | >200 | >200 | >200 |
| Adhesion | 4B | 2B | 3B–4B | ≈6B |
| Appearance | Transparent | as left | as left | as left |

*Percentage of total weight.
**The ratio of melamine/total-diol.

TABLE 20

Formulation of Oligoester-diol of Different MW with Hardener, Polyurethane-diol and Melamine Resin

| Oligo-diol MW | 300 | 520 | 735 | 840 |
|---|---|---|---|---|
| wt (g)/meq. wt | 2.0/13.33 | 2.0/7.69 | 2.0/5.44 | 2.0/4.76 |
| Polyurethane diol UD320 W wt (g)/meq. wt | 0.5/2.813 | 0.5/2.813 | 0.5/2.813 | 0.5/2.813 |
| Hardener (I) THECA wt (g)/meq. wt | 0.25/2.87 | 0.25/2.87 | 0.25/2.87 | 0.25/2.87 |
| Hardener (II) 6GT wt (g)/meq. wt | 0.25/0.81 | 0.25/0.81 | 0.25/0.81 | 0.25/0.81 |
| Cymel 1135 wt (g)/meq. | 2.56/29.75 | 1.83/21.27 | 1.55/18.06 | 1.27/14.69 |
| | 4.60/5.40 | 3.79/6.21 | 3.41/6.591 | 2.96/7.04 |
| wt. ratio** | 1.5 | 1.5 | .5 | 1.36 |
| eq. wt. ratio** | | | | |
| Solsperse-24000* | 1% | 1% | 1% | 1% |
| BYK-358* | 0.5% | 0.5% | 0.5% | 0.5% |
| DNNDSA* | 1% | 1% | 1% | 1% |
| Panel | Q-PHOS R-36-1 | Q-PHOS R-36-1 | Q-PHOS R-36-1 | Q-PHOS R-36-1 |
| Film-thick (mil) | 1.0 | 1.0 | 0.8–1.1 | 1.0–1.1 |
| Direct Impact (lb-inch) | >40 | ≈80 | >80 | ≈120 |
| Reverse Impact (lb-inch) | <20 | <40 | <40 | ≈40 |
| Pencil-hard | 6H | 5H | 3H–4H | 2H |
| MEK Rub Resist. | >200 | >200 | >200 | >200 |
| Adhesion | 4B | 3B–4B | ≈4B | 4B |
| Appearance | Transparent | as left | as left | as left |

*Percentage of total weight.
**The ratio of melamine/total-diol.

(b) Formulations of an Oligoester Diol and Hardeners with mixed Crosslinkers

Tables 21–23 describe formulation of oligoester-diols in combination with hardeners and mixtures of crosslinkers.

TABLE 21

Formulation of Oligoester-diol with Mixed Crosslinkers of Melamine Resin, Polyisocyanate and TiO$_2$.

| Oligo-diol wt (g)/meq. wt | 3.0/11.54 | 3.0/11.54 | 3.0/11.54 | 3.0/11.54 | 3.0/11.54 |
|---|---|---|---|---|---|
| M$_n$ | 520 | 520 | 520 | 520 | 520 |
| Luxate XHD0700 | 0.65/3.48 | 0.65/3.48 | 0.65/3.48 | 0.65/3.48 | 0.65/3.48 |
| Cymel 1135 wt (g)/meq. wt. | 2.0/23.26 | 2.0/23.26 | 2.0/23.26 | 2.0/23.26 | 2.0/23.26 |
| TiO$_2$ DuPont R700 % of binders | 53% | 53% | 57.5% | 57.5% | 57.5% |
| Solsperse-24000* | 1% | 1% | 1% | 1% | 1% |
| BYK-077 (defoamer)* | 0.5% | 0.5% | 0.5% | 0.5% | 0.5% |
| DNNDSA* | 1% | 1% | 1% | 1% | 1% |
| Solvent (MEK)* | — | 10% | — | 5% | 5% |
| Panel | Q-PHOS R-36-1 | Q-PHOS R-36-1 | Q-PHOS R-36-1 | Q-PHOS R-36-1 | QPanel R-36 |
| Film-thick (mil) | 1.0–1.1 | 0.9–1.0 | 1.0 | 0.8–1.0 | 0.8 |
| Direct Impact (lb-inch) | 120 | 160 | 120 | 120 | 80 |
| Reverse Impact (lb-inch) | ≈100 | ≈100 | 60 | 60 | <60 |
| Pencil-hard | 3H | 3H–4H | 2H | 2H–3H | 2H–3H |
| MEK Rub Resist. | >200 | >200 | >200 | >200 | >200 |
| Adhesion | 4B–5B | 4B | 3B–4B | 4B | 0–1B |
| Appearance | White | White | White | White | White |

*Percentage of total weight.

TABLE 22

Formulation of Oligoester-diols with mixed Crosslinkers of Melamine Resin, Polyisocyanate and Hardener THECA.

| Oligoester-diol M$_n$ | 300 | 520 |
|---|---|---|
| wt (g)/meq. wt. | 10.1/66.67 | 14.4/55.38 |
| Luxate XHD 0700 wt (g)/meq. wt | 2.36/12.62 | 3.6/19.25 |
| Cymel 1135 wt. (g)/meq. wt. | 8.84/102.79 | 12.0/139.53 |
| THECA wt(g)/meq. wt | 1.8/20.69 | 3.63/41.72 |
| Solsperse 24000 | 1% | 1% |
| BYK-077 (defoamer)* | 0.5% | 0.5% |
| DNNDSA* | 1% | 1% |
| Panel | Q-PHOS R-36-1 | Q-PHOS R-36-1 |
| Film thickness (mil) | 1.0–1.1 | 1.1 |
| Direct Impact lb/in | <120 | <120 |
| Reverse Impact lb/in | <60 | <60 |
| Pencil Hardness | 5H | 5H |
| MEK Rub Resistance | >200 | >200 |
| Adhesion | 4B–5B | 3B–4B |
| Appearance | Transparent | Transparent |

*Percentage of the total weight.

TABLE 23

Formulation of Oligoester-diols with mixed Crosslinkers of Melamine Resin, Polyisocyanate and Hardener AY-1.

| Oligoester-diol M$_n$ | 300 | 520 |
|---|---|---|
| wt (g)/meq. wt. | 10.1/66.67 | 14.4/55.38 |
| Luxate XHD 0700 wt (g)/meq. wt | 2.68/14.33 | 4.0/21.39 |
| Cymel 1135 wt. (g)/meq. wt. | 10.0/116.28 | 14.4/167.44 |
| AY-1 wt (g)/meq. wt. | 3.44/20.0 | 4.8/27.91 |
| Solsperse 24000 | 1% | 1% |
| BYK-077 (defoamer)* | 0.5% | 0.5% |
| DNNDSA* | 1% | 1% |
| Panel | Q-PHOS R-36-1 | Q-PHOS R-36-1 |
| Film thickness (mil) | 1.0–1.3 | 1.0–1.3 |
| Direct Impact lb/in | ≈80 | >120 |
| Reverse Impact lb/in | <20 | ≈60 |
| Pencil Hardness | 6H | 6H |
| MEK Rub Resistance | >200 | >200 |
| Adhesion | 4B–5B | ≈4B |
| Appearance | Transparent | Transparent |

*Percentage of the total weight.

TABLE 24

Formulation of mixed Oligoester-diols with mixed Crosslinkers and Hardener.

| Oligoester-diol (1) M$_n$ wt (g)/meq. wt. | 520 1.0/3.85 | 520 1.0/3.85 |
|---|---|---|
| Oligoester-diol (2) M$_n$ | F931013-4 1420 | F931013-4 1420 |

TABLE 24-continued

Formulation of mixed Oligoester-diols with mixed Crosslinkers and Hardener.

| wt (g)/meq. wt. | 1.0/1.41 | 1.0/1.41 |
|---|---|---|
| Luxate XHD 0700 | 0.25/1.34 | 0.25/1.34 |
| wt (g)/meq. wt |  |  |
| Cymel 1135 | 1.07/13.39 | 0.95/12.24 |
| wt. (g)/meq. wt. |  |  |
| Hardener | AY-1 | THECA |
| wt (g)/meq. wt. | 0.5/2.91 | 0.5/5.75 |
| Solsperse 24000 | 1% | 1% |
| BYK-077 (defoamer)* | 0.5% | 0.5% |
| DNNDSA* | 1% | 1% |
| Panel | Q-PHOS R-36-1 | Q-PHOS R-36-1 |
| Film thickness (mil) | 1.0 | 1.0–1.2 |
| Direct Impact lb/in | 100 | 100 |
| Reverse Impact lb/in | 60 | ≈60 |
| Pencil Hardness | 5H | 3H–4H |
| MEK Rub Resistance | >200 | >200 |
| Adhesion | 5B | 4B–5B |
| Appearance | Transparent | Transparent |

*Percentage of the total weight.

What is claimed is:

1. A polymeric vehicle having at least about 88 weight percent solids which polymeric vehicle is effective for providing a formulated coating composition which formulated coating composition does not require an organic solvent for application to a substrate and is liquid at not more than about 50° C., the polymeric vehicle comprising:

at least one linear oligoester diol having a number average molecular weight in the range of from about 275 to about 1200, a polydispersity index of less than about 2.6 and a viscosity of not more than about 1.2 Pa.s at from about 20° C. to about 50° C., the oligoester diol having a structure which includes a longitudinal chain, the longitudinal chain having segments, not more than about 3% of the segments comprising segments other than —CH$_2$—, —O—, —C(=O)—, the oligoester being terminated with hydroxyl groups;

at least one phenolic ester alcohol hardener having at least two hydroxyl groups; and a crosslinker selected from the group consisting of at least one polyisocyanate, at least one amino resin, and a blend of at least one polyisocyanate and at least one amino resin, the crosslinker has a functionality which is greater than about 2.4, which functionality is reactive with the hydroxyl groups of the oligoester diol and hardener and which crosslinker is at least in a stoichiometric amount which will react with the oligoester diol and the hardener, the crosslinker, hardener and oligoester diol forming a blend having a viscosity in the range of from about 0.1 to about 20 Pa.s at about 20 to about 60° C. at a shear of about 1000 sec.$^{-1}$ without the addition of organic solvent, and the crosslinker being soluble in the linear oligoester diol.

2. A polymeric vehicle as recited in claim 1 wherein the phenolic ester alcohol has two ester groups.

3. A polymeric vehicle as recited in claim 3 wherein the phenolic ester alcohol is

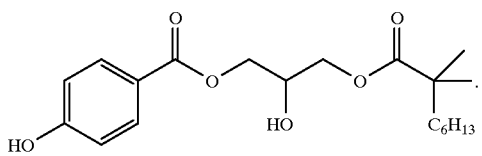

4. A polymeric vehicle as recited in claim 1 wherein the oligoester diol has a polydispersity index of less than about 2.2, and the crosslinker is liquid at about 10° C.

5. A polymeric vehicle as recited in claim 4 wherein the polymeric vehicle has at least about 92 weight percent solids.

6. A polymeric vehicle as recited in claims 2 or 5 wherein the oligoester has a viscosity in the range of from about 0.1 to about 1.2 Pa.s at a temperature in the range of from about 20° C. to about 50° C. and a polydispersity index of less than about 1.8.

7. A polymeric vehicle having at least about 88 weight percent solids, the polymeric vehicle comprising:

at least one linear oligoester diol having a number average molecular weight in the range of from about 275 to about 1200, a polydispersity index of less than about 2.6 and a viscosity of not more than about 1.2 Pa.s at from about 20° C. to about 50° C., the linear oligoester is the reaction product of components selected from the group consisting of (1) a diol and a carboxylic acid or an ester thereof wherein the acid has an odd number of carbon atoms, (2) a mixture of different carboxylic acids, esters thereof or different diols, and (3) mixtures of (1) and (2), and wherein there is not more than 16 carbon atoms in the carboxylic acid and diol, the oligoester diol having a structure which includes a longitudinal chain, the longitudinal chain having segments, not more than about 3% of the segments comprising segments other than —CH$_2$—, —O—, —C(=O)—, the oligoester being terminated with hydroxyl groups, at least one phenolic ester alcohol hardener having at least two hydroxyl groups;

which oligoester diol is effective for crosslinking with a stoichiometric amount of crosslinker which has a functionality which is greater than about 2.4 and which functionality is reactive with the hydroxyl groups of the oligoester diol and hardener, the crosslinker, hardener and oligoester diol effective for forming a blend having a viscosity in the range of from about 0.1 to about 20 Pa.s at about 20 to about 60° C. at a shear of about 1000 sec.$^{-1}$, and the crosslinker being soluble with the linear oligoester diol when mixed therewith.

8. A polymeric vehicle as recited in claim 4 wherein the phenolic ester alcohol has two ester groups.

9. A polymeric vehicle as recited in claim 8 wherein the phenolic ester alcohol is

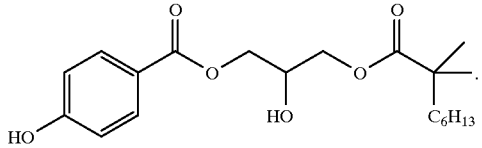

10. A polymeric vehicle as recited in claim 8 wherein the oligoester diol has a polydispersity index of less than about 2.2, and the crosslinker is liquid at about 10° C.

11. A polymeric vehicle as recited in claim 9 wherein the polymeric vehicle has at least about 92 weight percent solids.

12. A polymeric vehicle as recited in claims 4 or 11 wherein the oligoester has a viscosity in the range of from about 0.1 to about 1.2 Pa.s at a temperature in the range of from about 20° C. to about 50° C. and a polydispersity index of less than about 1.8.

13. A polymeric vehicle having at least about 88 weight percent solids, the polymeric vehicle comprising:
- at least one linear oligoester diol having a number average molecular weight in the range of from about 275 to about 1200, a polydispersity index of less than about 2.6 and a viscosity of not more than about 1.2 Pa.s at from about 20° C. to about 50° C., the linear oligoester is the reaction product of components selected from the group consisting of (1) a diol and a carboxylic acid or an ester thereof wherein the acid has an odd number of carbon atoms, (2) a mixture of different carboxylic acids, esters thereof or different diols, and (3) mixtures of (1) and (2), and wherein there is not more than 16 carbon atoms in the carboxylic acid and diol, the oligoester diol having a structure which includes a longitudinal chain, the longitudinal chain having segments, not more than about 3% of the segments comprising segments other than —$CH_2$—, —O—, —C(=O)—, the oligoester being terminated with hydroxyl groups;
- at least one phenolic ester alcohol hardener having at least two hydroxyl groups;
- the polymeric vehicle effective for providing a coating binder with a hardness of at least about B when applied to a substrate at a thickness of about 1 mil dry after crosslinking with a crosslinker selected from the group consisting of at least one amino resin, at least one polyisocyanate and a blend of at least one polyisocyanate and at least one amino resin, the crosslinker having a functionality which is greater than about 2.4 and which functionality is reactive with the hydroxyl groups of the oligoester diol and hardener,
- crosslinker, hardener and oligoester diol forming a blend having at least a stoichiometric amount of crosslinker which will react with the oligoester diol, a viscosity in the range of from about 0.1 to about 20 Pa.s at about 20 to about 60° C. at a shear of about 1000 sec.$^{-1}$, and the crosslinker being soluble with the linear oligoester diol when mixed therewith.

14. A polymeric vehicle as recited in claim 13 wherein the phenolic ester alcohol has two ester groups.

15. A polymeric vehicle as recited in claim 14 wherein the phenolic ester alcohol is

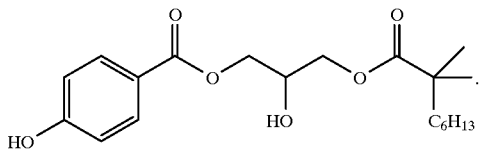

16. A polymeric vehicle as recited in claim 13 wherein the oligoester diol has a polydispersity index of less than about 2.2, and the crosslinker is liquid at about 10° C.

17. A polymeric vehicle as recited in claim 15 wherein the polymeric vehicle has at least about 92 weight percent solids.

18. A polymeric vehicle as recited in claims 13 or 17 wherein the oligoester has a viscosity in the range of from about 0.1 to about 1.2 Pa.s at a temperature in the range of from about 20° C. to about 50° C. and a polydispersity index of less than about 1.8.

19. A polymeric vehicle having at least about 88 weight percent solids which polymeric vehicle is effective for providing a formulated coating composition which formulated coating composition does not require an organic solvent for application to a substrate and is liquid at not more than about 50C., the polymeric vehicle comprising:
- at least one linear oligoester diol having a number average molecular weight in the range of from about 275 to about 1200, a polydispersity index of less than about 2.6 and a viscosity of not more than about 1.2 Pa.s at from about 20° C. to about 50° C., the oligoester diol having a structure which includes a longitudinal chain, the longitudinal chain having segments, not more than about 3% of the segments comprising segments other than —$CH_2$—, —O—, —C(=O)—, the oligoester being terminated with hydroxyl groups;
- at least one phenolic ester alcohol hardener having at least two hydroxyl groups;
- the polymeric vehicle effective for providing a coating binder with a hardness of at least about B when applied to a substrate at a thickness of about 1 mil dry after crosslinking with a crosslinker selected from the group consisting of at least one amino resin, at least one polyisocyanate and a blend of at least one polyisocyanate and at least one amino resin, the crosslinker having a functionality which is greater than about 2.4 and which functionality is reactive with the hydroxyl groups of the oligoester diol and hardener,
- crosslinker, hardener and oligoester diol forming a blend having at least a stoichiometric amount of crosslinker which will react with the oligoester diol, a viscosity in the range of from about 0.1 to about 20 Pa.s at about 20 to about 60° C. at a shear of about 1000 sec.$^{-1}$, and the crosslinker being soluble with the linear oligoester diol when mixed therewith.

20. A polymeric vehicle as recited in claim 19 wherein the phenolic ester alcohol has two ester groups.

21. A polymeric vehicle as recited in claim 20 wherein the phenolic ester alcohol is

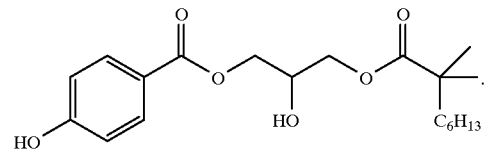

22. A polymeric vehicle as recited in claim 21 wherein the oligoester diol has a polydispersity index of less than about 2.2, and the crosslinker is liquid at about 10° C.

23. A polymeric vehicle as recited in claim 22 wherein the polymeric vehicle has at least about 92 weight percent solids.

24. A polymeric vehicle as recited in claim 19 wherein the oligoester has a viscosity in the range of from about 0.1 to about 1.2 Pa.s at a temperature in the range of from about 20° C. to about 50° C. and a polydispersity index of less than about 1.8.

25. A polymeric vehicle as recited in claims 7 or 9 wherein the polymeric further includes a crosslinker selected from the group consisting of at least one polyisocyanate, at least one amino resin, and a blend of at least one polyisocyanate and at least one amino resin.

26. A polymeric vehicle as recited in claims 7 or 9 wherein the polymeric further includes a crosslinker selected from the group consisting of at least one polyisocyanate, at least one amino resin, and a blend of at least one polyisocyanate and at least one amino resin.

27. A polymeric vehicle as recited in claims 13 or 15 wherein the polymeric further includes a crosslinker selected from the group consisting of at least one polyisocyanate, at least one amino resin, and a blend of at least one polyisocyanate and at least one amino resin.

28. A polymeric vehicle as recited in claims 19 or 21 wherein the polymeric further includes a crosslinker selected from the group consisting of at least one polyisocyanate, at least one amino resin, and a blend of at least one polyisocyanate and at least one amino resin.

\* \* \* \* \*